United States Patent
Zaoralek

(10) Patent No.: US 6,436,022 B1
(45) Date of Patent: Aug. 20, 2002

(54) ROLL ADJUSTABLE IN SHAPE

(75) Inventor: Heinz-Michael Zaoralek, Königsbronn (DE)

(73) Assignee: Schwabische Huttenewerke GmbH, Aalen-Wasseralfingen (DE)

( * ) Notice: Subject to any disclaimer, the term of this patent is extended or adjusted under 35 U.S.C. 154(b) by 0 days.

(21) Appl. No.: 08/894,828

(22) PCT Filed: Mar. 19, 1996

(86) PCT No.: PCT/EP96/01183

§ 371 (c)(1),
(2), (4) Date: Aug. 28, 1997

(87) PCT Pub. No.: WO96/32536

PCT Pub. Date: Oct. 17, 1996

(30) Foreign Application Priority Data

Apr. 10, 1995 (DE) .......................... 195 13 500

(51) Int. Cl.⁷ ................................. F28F 5/02
(52) U.S. Cl. ............................ 492/46; 492/47
(58) Field of Search ............... 492/46, 47; 165/89, 165/90

(56) References Cited

U.S. PATENT DOCUMENTS

| 3,581,812 A | * | 6/1971 | Fleissner | 165/89 |
|---|---|---|---|---|
| 3,738,423 A | * | 6/1973 | Fleissner | 165/89 |
| 4,050,510 A | | 9/1977 | Theysohn | |
| 4,268,943 A | * | 5/1981 | Watannabe et al. | 492/47 |
| 4,399,169 A | * | 8/1983 | McGowan | 492/47 |
| 4,621,400 A | * | 11/1986 | Van Der Graaf | 492/47 |
| 4,658,486 A | * | 4/1987 | Schonemann | 492/46 |
| 4,793,459 A | * | 12/1988 | Forknall et al. | 492/47 |
| 4,920,623 A | * | 5/1990 | Neuhoffer et al. | 492/46 |
| 5,152,333 A | * | 10/1992 | Barbe et al. | 492/46 |
| 5,383,833 A | * | 1/1995 | Brugger et al. | 492/46 |
| 5,662,572 A | * | 9/1997 | Zaoralek | 492/46 |
| 5,725,466 A | | 3/1998 | Eppli et al. | |

FOREIGN PATENT DOCUMENTS

| DE | 40 36 121 A1 | | 1/1992 | | |
|---|---|---|---|---|---|
| DE | 43 43 172 C1 | | 1/1995 | | |
| EP | 0 411 427 | | 2/1991 | | |
| GB | 001252549 | * | 11/1971 | | 492/47 |
| GB | 002121919 A | * | 1/1984 | | 492/46 |
| SU | 001391906 A | * | 4/1988 | | 492/46 |

* cited by examiner

Primary Examiner—S. Thomas Hughes
Assistant Examiner—T. Nguyen
(74) Attorney, Agent, or Firm—Renner, Otto, Boiselle & Sklar, LLP

(57) ABSTRACT

Through the flanged trunnion of a heated roll for the treatment of a material web, more particularly a calender roll, a partial flow of the heat transfer fluid used for heating is diverted between the supply and return of the fluid so that the flanged trunnion is heated or cooled in its central portion. For influencing the radial expansion of the trunnion when subjected to heat and increasing the fluid flow heating or cooling the trunnion, the trunnion may comprise a central cavity sealing off the centerbore of the roll, the partial flow of the heat transfer fluid being directed through this central cavity.

12 Claims, 2 Drawing Sheets

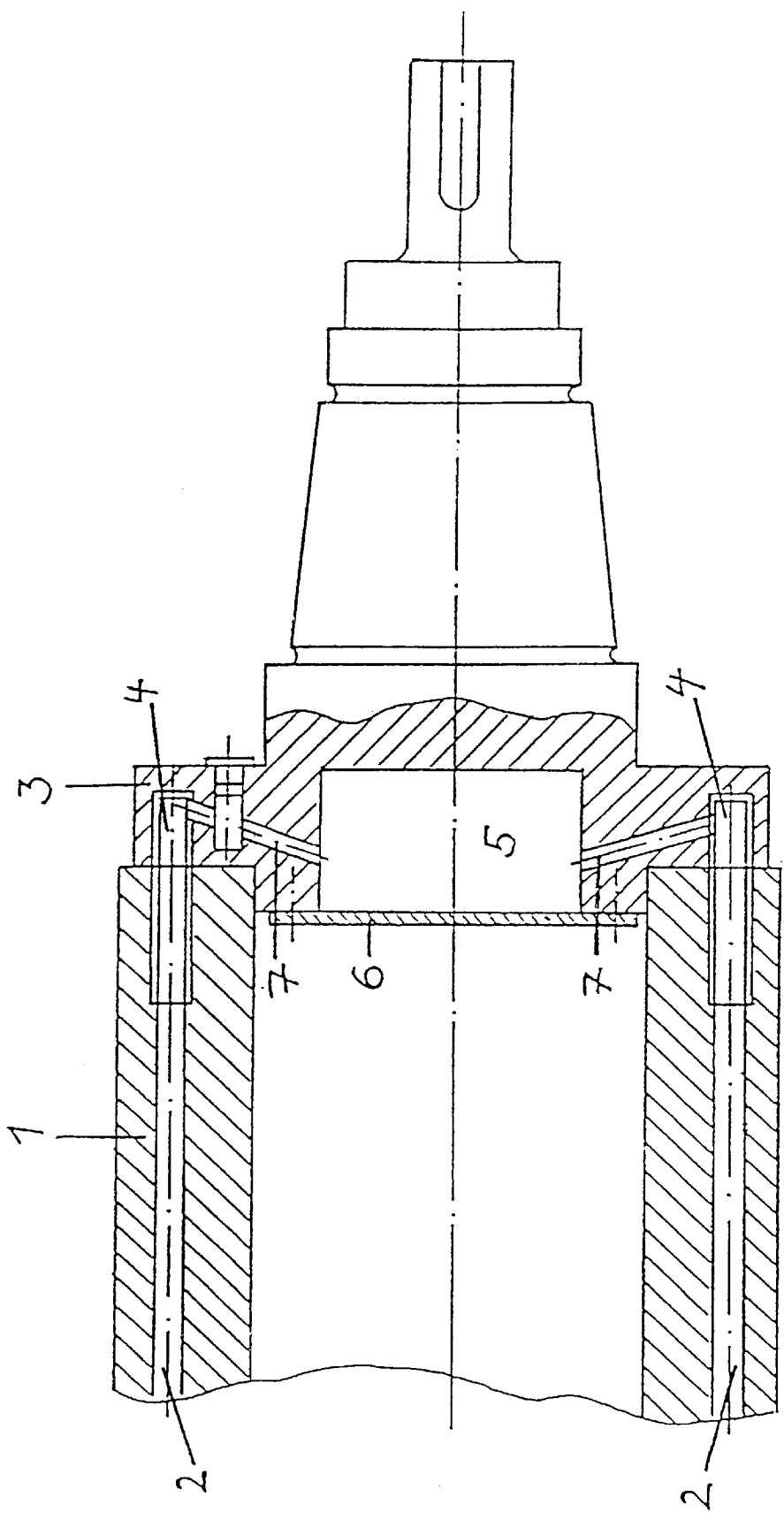

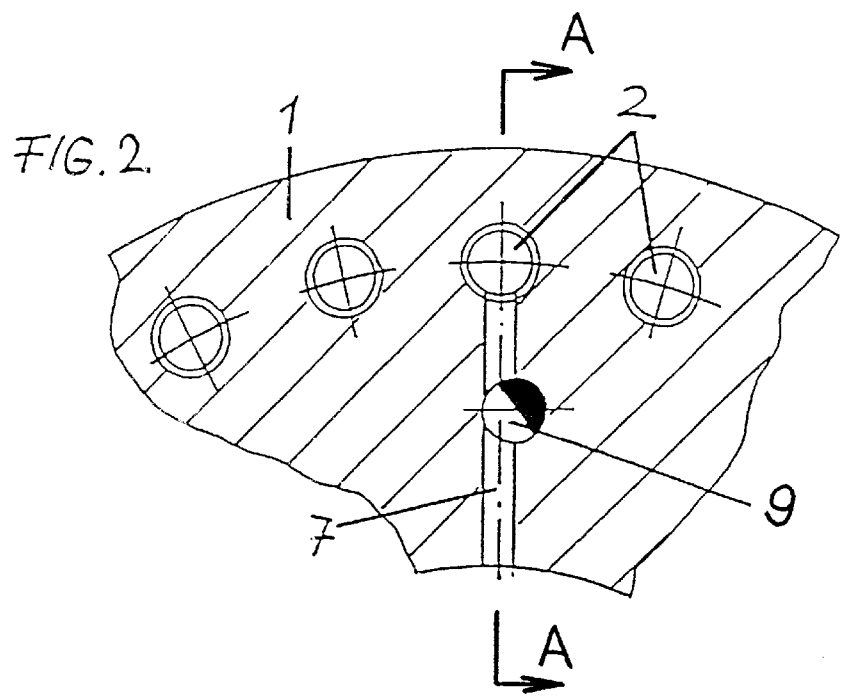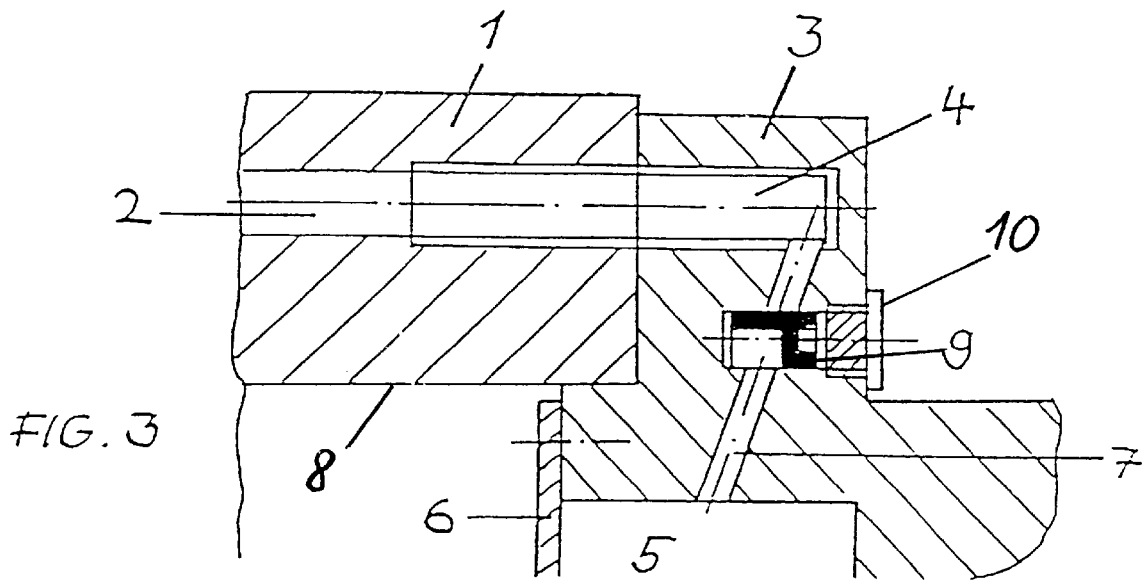

ROLL ADJUSTABLE IN SHAPE

BACKGROUND OF THE INVENTION

1. Field of the Invention

The invention relates to the design configuration of so-called calender rolls. These are rolls employed preferably in the glazing or smoothing section of paper machines, i.e. at the position at which the the already completed paper web receives its surface finish. However, corresponding rolls may also be employed, for example, in rolling mills for plastics films or in coating webs of fabric or paper.

2. Description of the Prior Art

Current prior art calender rolls are generally heated, various methods for heating the roll being applicable. The invention relates to rolls through which the heated heat transfer fluid, such as, for example, water or oil passes. Heating the roll in this case results by heat transfer from the fluid to the body of the roll. Likewise the considerations in accordance with the invention are applicable for rolls which are correspondingly cooled, i.e. by means of fluid passing through, the temperature of which is below that of the body of the roll.

One version of such rolls having a fluid through-flow is the so-called peripherally drilled roll. In this the body of the roll comprises axial parallel drilled passages distributed evenly on the circumference and as close as possible to the surface, through which the fluid flows. To achieve a consistent heating (or cooling) of the body the fluid is directed from one end of the roll to the other and back to the discharge end. In the so-called DUOPASS roll a return (=back flow) drilled passage is assigned to each supply (=inflow) drilled passage, two of the supply passages each corresponding to one return drilled passage in the so-called TRIPASS 2 roll.

To produce the connection between drilled passages for the supply and return flow diversion passages are arranged in the corresponding end of the roll. The end of the roll is generally provided with a bolted trunnion in which the diversion passages are located. However, in rolls having so-called floating bearings the diversion passages may be located between the shell of the roll and the mounting axle. Such rolls are termed to have "floating" bearings when a roll shell open at the ends is hydraulically supported by a fixed central axle about which it rotates.

It is particularly the case with large diameter calender rolls that the roll features in addition to the described peripheral drilled passages an enlarged centerbore serving to save mass and weight and which is maintained free of the heat transfer fluid. In this way the weight of the roll remains low and the volume of heat transfer fluid required is reduced, simultaneously resulting in savings in energy costs.

Practically all of the rolls of this type, when having a large diameter, are driven by means engaging a trunnion, i.e. are entrained not only by the material web passing through or by the counter roll. In this case the fluid is supplied through the trunnion facing away from the drive end, the returning fluid passing through this trunnion and then also leaving the roll. In the trunnion at the drive end the diversion of the fluid from the supply to the return drill passages is provided.

To limit the quantity of heat flowing into the diversion trunnion both the supply and outlet passages and the peripheral drilled passages in the immediate vicinity of the trunnion and the diversion passages in the trunnion are insulated. Without this insulation the trunnion would be heated up stronger than the body of the roll and expand radially more than the body of the roll. Due to the existing bolted connection this expansion would be transferred also to the body of the roll to aggravate the so-called Oxbow Effect occurring in any case at the edges of the body of the roll. Since to avoid being damaged at the edges the material web guided over the body of the roll needs to be slightly narrower than the so-called web length of the roll, the loss in heat of the roll body at the narrow portions of the web remaining free at the end of the roll is less than otherwise at the roll surface, as a result of which the ends of the roll when heated feature a larger diameter than the roll portion located further towards the middle of the roll. This effect is highly undesirable for treatment of the material web. Attempts are made to obviate this effect, more particularly, by arranging for a reduced heat supply to the end of the roll or to provide special cooling thereof. Any amplification in this effect as may materialize from an additional increase in temperature of the trunnion is unacceptable.

The non-driven trunnion is as regards amplification of the Oxbow Effect particularly critical since the supply and discharge passages are also located therein. On the other hand at the drive end of the roll an overcompensation of the Oxbow Effect may occur under certain operating conditions. Since at this end only diversion passages exist for the heat transfer fluid this trunnion receives significantly less heat energy than the opposite end. In addition, the bearing locations of the driving trunnion need to be maintained cool. As a result of this heat energy flows away from the end portion of the roll to the drive end via the trunnion to the bearing locations. The trunnion itself remains significantly cooler and is expanded corresponding less than the body of the roll. The same negative effect materializes from the usually solid, central portion of the trunnion extending into the centerbore of the body of the roll and thus obstructing the expansion of the trunnion flange corresponding to the edge of the roll body to which it is bolted. The roll edge of the drive end of the roll thus becomes smaller in diameter then otherwise for the roll web. The web of material in this portion is exposed to less pressure than the remaining web length of the roll which in paper production results in so-called hard edges of the paper web or even under extreme conditions in rupturing of or bursting open the paper edge. Before being reeled such edges need to be cut off. The resulting loss in production web may amount to serious percentages of production as a whole.

SUMMARY OF THE INVENTION

The purpose of the present invention is to counteract the problems described at the drive end of the heated calender rolls without making the manufacture of the drive end trunnion appreciably more expensive. For this purpose it is provided for that bypass passages are arranged in the drive end trunnion, through which part of the heat transfer fluid is returned from the peripheral supply drilled passages through the center of the trunnion back into the return drill passages. In addition, the center of the trunnion may receive a centerbore sealed off from the centerbore of the roll in which heat transfer fluid can collect to boost the increase in temperature. At the same time, this drilled passage improves the ability of the trunnion to expand so that it presents less resistance to the expansion of the body of the roll.

In a further aspect in accordance with the invention control means are arranged in the bypass passages in the drive end trunnion permitting external adjustment, through which the flow of heat transfer fluid and thus the increase in temperature of the trunnion can be influenced in keeping with the given operating conditions. This enables an optimum control of fluid flow when starting the calender.

BRIEF DESCRIPTION OF THE DRAWINGS

This aspect in accordance with the invention will now be explained with respect to the drawings as shown in FIGS. 1 to 3.

FIG. 1 is a cross-section through the drive end of a peripherally drilled roll having a large centerbore, FIG. 2 showing the same section on a magnified scale high-lighting a rotary valve arranged in a diversion passage, and FIG. 3 illustrating a section through the trunnion as shown in FIGS. 1 and 2 in the plane A—A.

DESCRIPTION OF THE PREFERRED EMBODIMENT

As evident from FIG. 1 the body of the roll (1) features peripheral drilled passages (2) and a trunnion (3) bolted thereto with diversion passages (4) (also herein referred to as connecting passages) arranged therein. The latter may be configured either as a milled groove or, as described in prior art P 4404922.6-12, as drilled passages. To this extent the trunnion corresponds to prior art.

In the trunnion (3) drilled bypass passages (7) run from the diversion passages (4) to a central cavity (5), these drilled bypass passages (7) being thinner than the peripheral drilled passages (2). Whilst the peripheral drilled passages (2) may have a diameter of 32 mm, for example, the diameter of the drilled bypass passages (7) amounts to only 10 mm to 15 mm. Relative to the centerbore (8) of the body of the roll the central cavity (5) is closed off tight by the cover (6).

The number of drilled bypass passages (7) is substantially less than that of the peripheral drilled passages (2) and (4). For example, a roll may comprise 30 peripheral drilled passages (2) but only six drilled bypass passages (7). In this arrangement the drilled bypass passages (7) are distributed symmetrically in pairs in the flange, i.e. so that one drill bypass passage (7) each intersects the supply end of a connecting passage (4) of the peripheral drilled passages, the second intersecting the return end.

So that the function in accordance with the invention is assured, it is necessary that a slight difference in pressure exists between the supply end and the return end of each connecting passage (4). In the case of the DUOPASS roll design this can be achieved by a restriction (not shown in the drawing) being arranged in the diversion passage (4). In the TRIPASS 2 design this difference in pressure materializes in accordance with the Bernoulli equation by the velocity of flow in the return being twice as high as in the supply drilled passages.

Due to the difference in pressure a minor portion of the heat transfer fluid is branched off from the system of the peripheral drilled passages and introduced into the cavity (5) which thus becomes filled with fluid. Due to the differences in the expansion of the fluid at differing temperatures hot fluid first flows to the center of the trunnion where it cools by giving off heat and is subsequently returned outwards by centrifugal force. Here, the cooler heat transfer fluid is drawn off through the drilled bypass passages (7) and returned to the system of peripheral drilled passages at the return end.

Since the volume of the fluid thus guided into the interior of the trunnion is low as compared to the volume flow as a whole and due to the symmetrical arrangement of the drilled bypass passages (7) there is no fear of the surface temperature and thus the shape of the roll being negatively affected.

On the other hand the heat energy given off to the cavity (5) results in a gentle heating of the trunnion internal region, leading via its expansion to an optimum shape of the roll edge.

To optimize this effect adjustable valves (9) are arranged in the drilled bypass passages (7) according to a further aspect of the invention, i.e. one valve for each pair of drilled bypass passages. In FIGS. 2 and 3 one such valve (9) is depicted as a rotary valve which can be actuated from the outer side of the trunnion. The drilled passage in which the valve is located is sealed off by the plug (10) when not actuated. When running the calender up to temperature the optimum position of the valve is to be established by trial and error, this being the position in which the through-flow of the heat transfer fluid is sufficiently high or low to induce best-possible expansion of the trunnion relative to the body of the roll.

Should axial access to the rotary valves be obstructed, which may be the case with certain embodiments of the roll drive, for example, due to the arrangement of the bearing housing, the valves may also be arranged radially accessible.

As already mentioned the invention also finds application when the calender roll needs to be cooled in operation, i.e. when in the case of the drive end trunnion the cooling effect is not sufficient, thus resulting in an undesirable expansion at the drive end of the roll. Also applicable is the device in accordance with the invention for "floating" rolls. In this case the supply and discharge of the heat transfer fluid is not made through a trunnion closing off the body of the roll but through a sealing element between the supporting axle and the rotating roll shell, the effect of which on the roll shell may be similar to that of a bolted trunnion, however. Since any person skilled in the art has no difficulty in deriving corresponding designs from the embodiment in accordance with the invention additionally illustrating this case separately has been dispensed with.

What is claimed is:

1. A heated roll for the treatment of a material web, comprising a cylindrical roll body including a center bore and axial peripheral supply and return passages; at least one drive end flanged trunnion assembled to an end of the roll body; and diversion passages connected between the peripheral supply passages and the peripheral return passages, and wherein the flanged trunnion includes at least one bypass passage for directing a bypass portion of the heat transfer fluid flowing between the peripheral supply passages and peripheral return passages through a center portion of the flanged trunnion for heating or cooling the center portion of the flanged trunnion, while another larger portion of the heat transfer fluid flows elsewhere through the diversion passages.

2. The heated roll as set forth in claim 1, wherein the flanged trunnion includes in the center portion thereof a central cavity at a face end portion of the flanged trunnion and which is sealed off from the centerbore of the roll body.

3. The heated roll as set forth in claim 2, wherein the at least one bypass passage directs the bypass portion of the heat transfer fluid to and away from the central cavity for flow through the central cavity of the flanged trunnion.

4. The heated roll as set forth in claim 1, wherein the bypass passage is a drilled bore in the flanged trunnion and the drilled bore includes therein a flow restriction.

5. The heated roll as set forth in claim 4, wherein the flow restriction is adjustable, whereby the bypass flow through the bypass passage can be regulated.

6. The heated roll as set forth in claim 5, wherein the flow restriction is a rotary valve.

7. The heated roll as set forth in claim 1, including an adjustable flow restriction in the bypass passage, whereby the bypass flow through the bypass passage can be regulated.

8. The heated roll as set forth in claim 1, wherein the peripheral supply and return passages are drilled in the roll body.

9. The heated roll as set forth in claim 8, wherein the flanged trunnion is bolted to the end of the roll body.

10. The heated roll as set forth in claim 9, wherein the bypass passage is a drilled bore in the flanged trunnion.

11. The heated roll as set forth in claim 1, wherein the diversion passages are located in the flanged trunnion.

12. The heated roll as set forth in claim 1, wherein the bypass passage has a diameter less than a diameter of the peripheral passages in the roll body.

* * * * *